United States Patent [19]

Steiner

[11] Patent Number: 4,865,442

[45] Date of Patent: Sep. 12, 1989

[54] SLIDE PROJECTOR SYSTEM

[76] Inventor: George Steiner, 226 Regent, Deux Montagnes, Quebec, Canada

[21] Appl. No.: 143,770

[22] Filed: Jan. 14, 1988

[30] Foreign Application Priority Data

Jan. 19, 1987 [CA] Canada ................................ 527593

[51] Int. Cl.⁴ ............................................ G03B 21/12
[52] U.S. Cl. .................................... 353/109; 353/120
[58] Field of Search ............... 353/108, 109, 113, 103, 353/114, 116, 120

[56] References Cited

U.S. PATENT DOCUMENTS

| | | |
|---|---|---|
| 2,311,946 | 2/1943 | Kroner . |
| 2,740,326 | 4/1956 | Reinebach ...................... 353/108 X |
| 3,139,793 | 7/1964 | Bradford et al. ............. 353/26 R X |
| 3,301,128 | 1/1967 | Brandt et al. .................... 353/109 X |
| 3,800,452 | 4/1974 | Kiehl . |
| 3,870,412 | 3/1975 | Denbleyker . |
| 3,905,694 | 9/1975 | Miragliotta . |
| 4,431,282 | 2/1984 | Martin Geb Böser . |
| 4,456,350 | 6/1984 | Drwiega . |
| 4,707,092 | 11/1987 | Mindell ............................. 353/109 |

FOREIGN PATENT DOCUMENTS

| | | | |
|---|---|---|---|
| 1144791 | 4/1983 | Canada . | |
| 1234223 | 10/1960 | France ................................ | 353/109 |
| 177045 | 3/1922 | United Kingdom ................ | 353/109 |

Primary Examiner—Harry N. Haroian

[57] ABSTRACT

A slide projector system adapted to the projection of a continuous train of slides. The train of slides moves in the form of a slide magazine across the body of the projector parallel to the plane of projection transported by a mechanism that assures movement from left to right in the forward direction and from right to left in the reverse direction. The train of slides moves from an open rectangular tray temporarily attached to the body of the projector on one side into another tray temporarily attached to the opposite side. The train of slides comprises an interconnected series of pockets that are naturally folded in an accordion position from which they unfold in traversing the body of the projector and fold again naturally upon leaving the projector body. The present invention includes the slide projector, the left and right slide trays, the slide train transport mechanism and the accordion slide magazine.

9 Claims, 5 Drawing Sheets

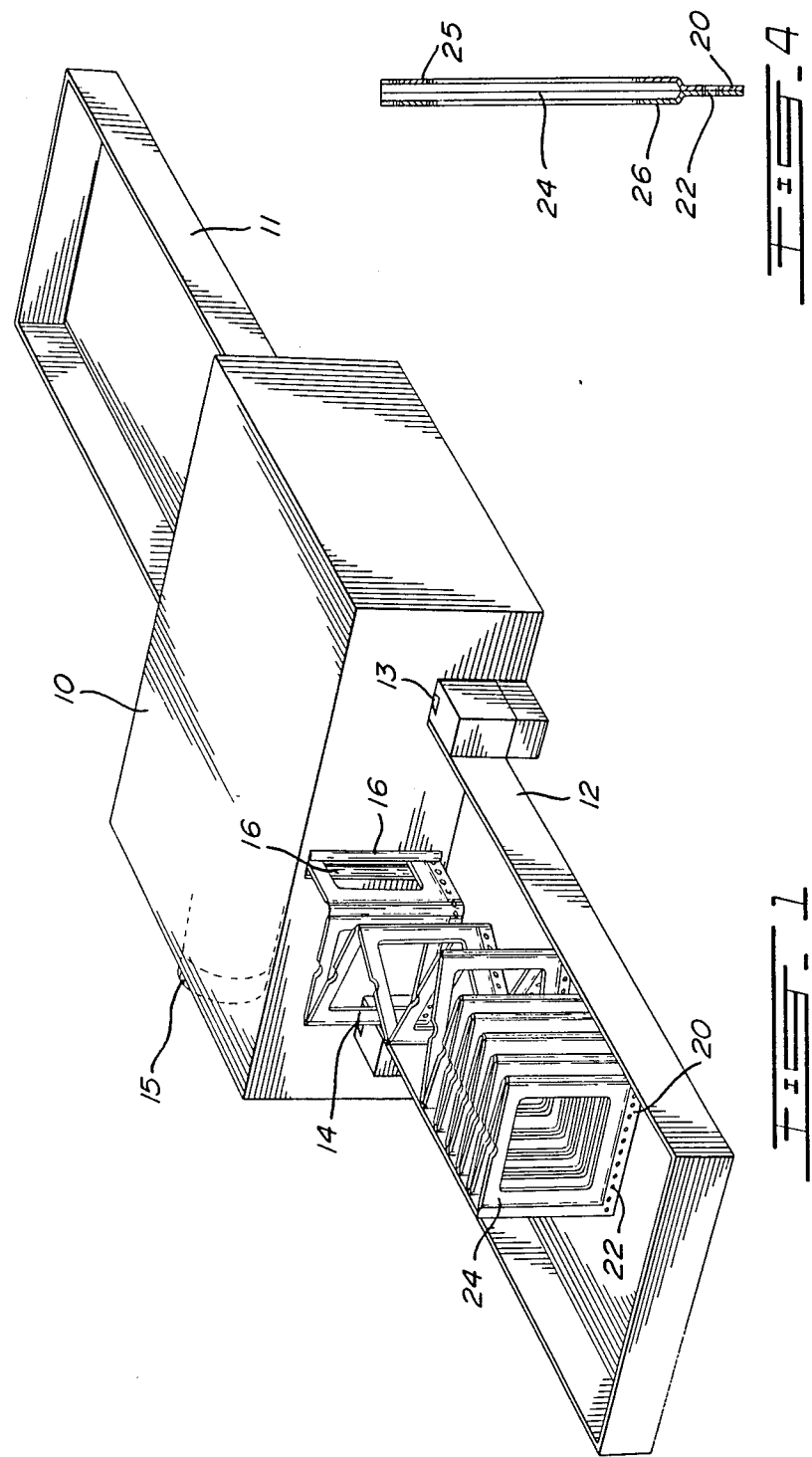

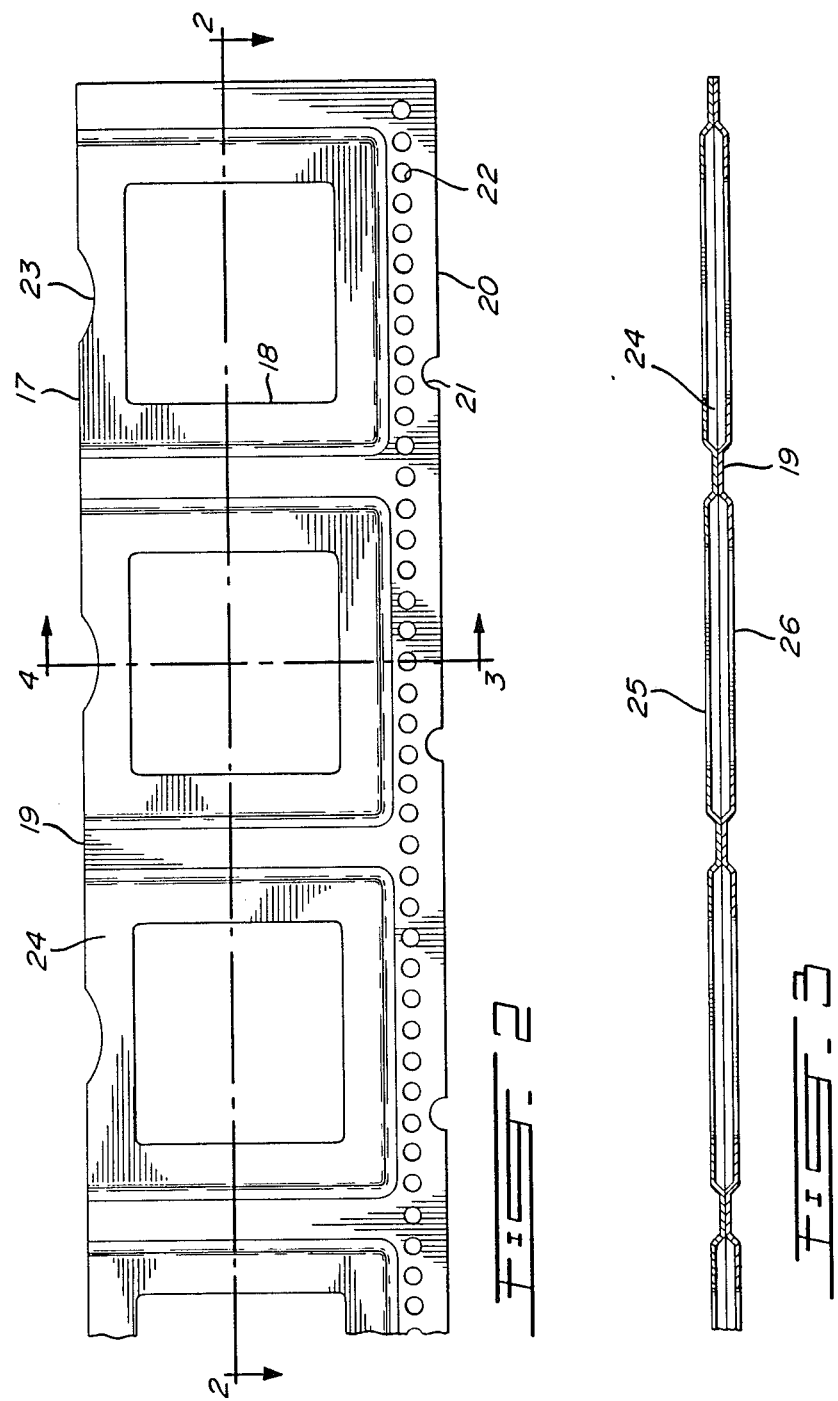

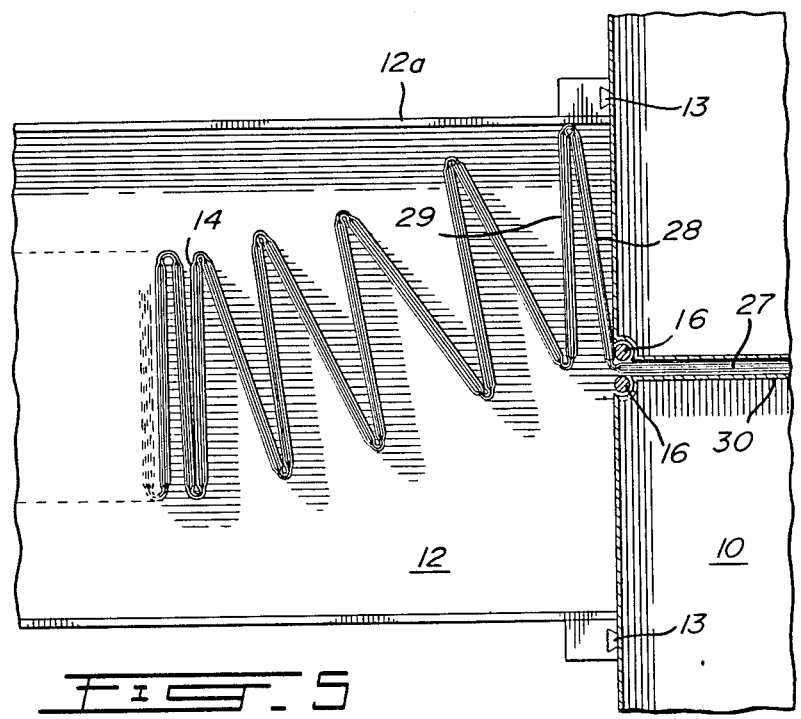
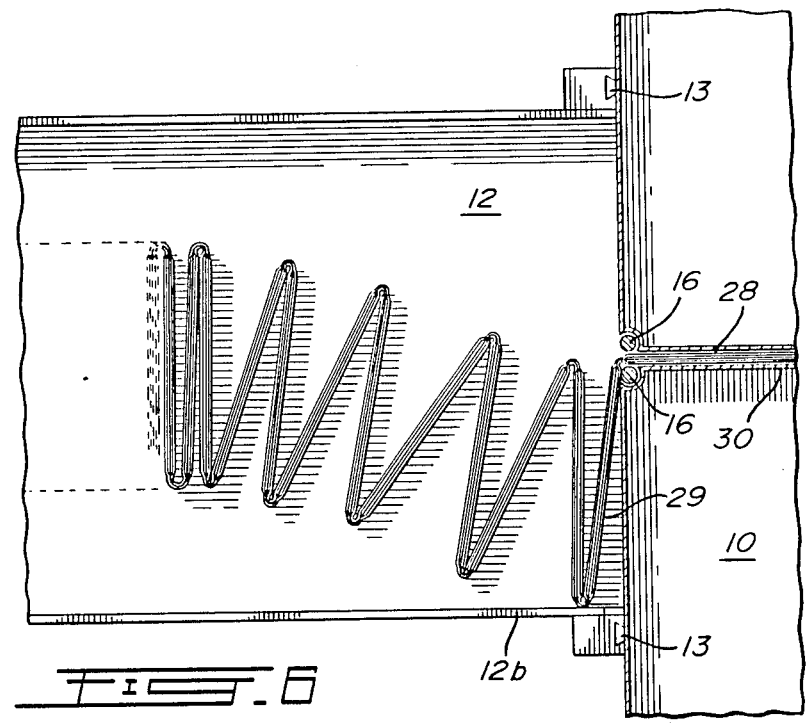

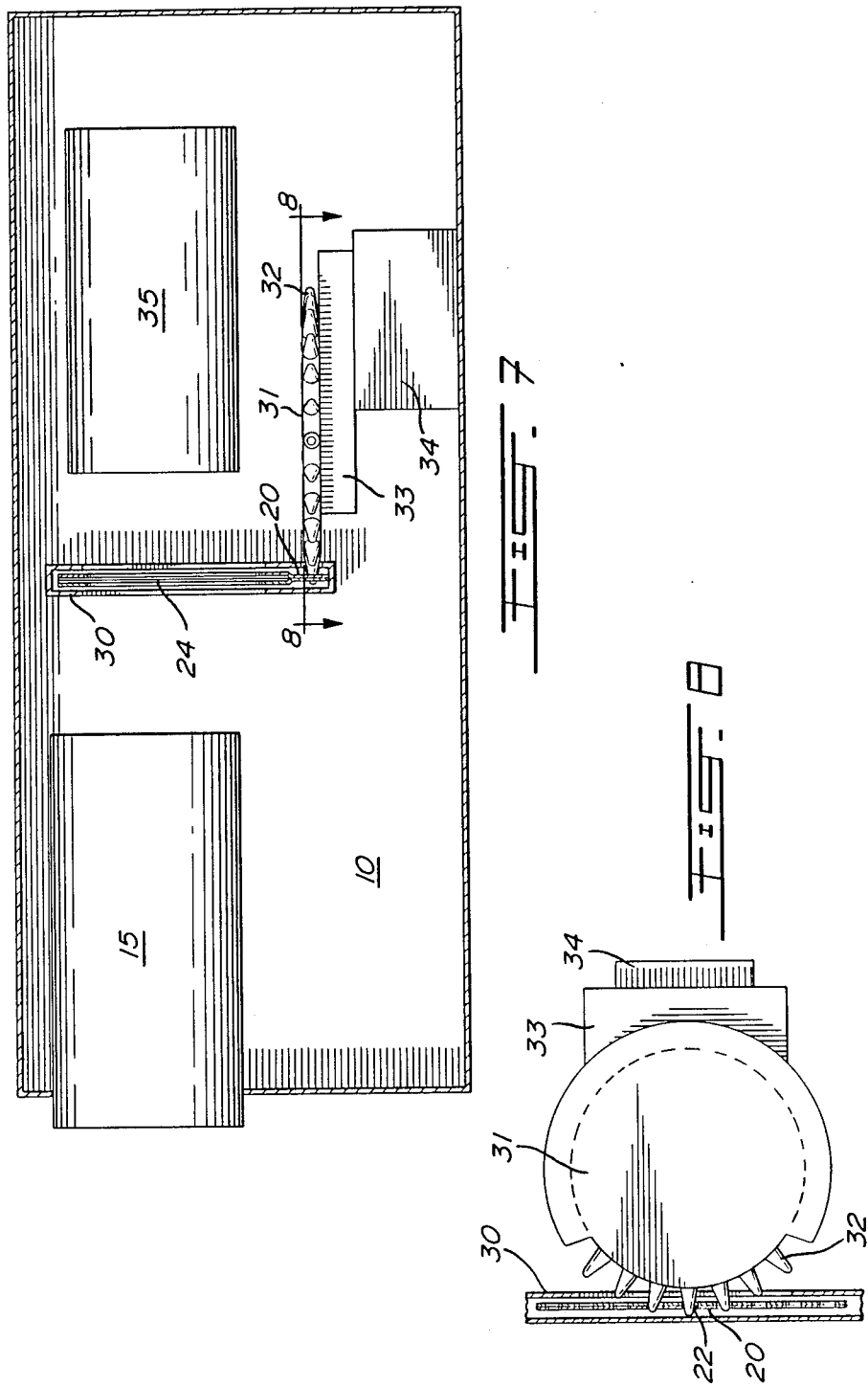

SLIDE PROJECTOR SYSTEM

This invention relates to a slide projector where an accordion slide magazine is transported across the projector from an open slide magazine storage tray. Each slide can be automatically stopped in the projection position and the slide magazine can form a permanent variable length slide storage.

In a conventional slide projection system consisting of a slide magazine and a projector, there are essentially two main types of magazines in use today: the circular type where slides are placed in a slot in a rigid circular magazine and a straight type where slides are placed in a long rigid magazine.

Apart from the above difference in the magazines, the projection systems as well as the mechanisms for removing and replacing slides from the magazine are similar. In every case the slide is removed from the magazine mechanically and a mechanical system replaces the slide in the magazine before advancing it to take the next slide. Several attempts have been made to improve on the conventional systems by proposing the projection of slides mounted in an interconnected series of pockets.

Up to now, slide projectors projecting slides mounted in a series of interconnected pockets have not been satisfactory. One of the reasons is the deficiency inherent in the transport mechanisms proposed which often result in the magazine jamming.

In one mechanism for projecting slides in a series of interconnected pockets, while electromechanical, cannot be reversed thus eliminating the possibility to review slides that have already passed the projection window. This particular proposal uses a friction drive which has the further disadvantage that it disengages between pockets where the material thickness changes.

There are yet other transportation means proposed, each suffering from one or several disadvantages which can be summarized as follows: limiting the attitude in which the slide magazine can be moved (e.g. horizontal only), slide positioning and slide moving are not independent requiring high tolerance in all components.

Yet another reason for which slide projectors employing slides mounted in interconnected pockets of an accordion slide magazine have not been satisfactory is the way in which the movement of such a magazine has been proposed. One proposal suggests a horizontal tray having a width similar to the length of a pocket. The disadvantage of this is that a magazine folded in an accordion position cannot be withdrawn from such a tray, it will jam.

Another proposal suggests a vertical tray where pockets from the magazine can be unfolded and withdrawn. The length of such a magazine is severely limited.

Yet another reason for which slide projectors employing slides mounted in a series of pockets have not been satisfactory is the way the construction of such a magazine has been proposed. In one proposal, a V-shaped wedge connected by an adhesive strip is proposed to ensure correct folding in one direction and not the other direction, requiring complicated moulding and assembly procedures. In another proposal, a metal hinge arrangement is proposed requiring again a complex moulding and assembly procedure.

It is an aim of the present invention to provide a slide projector system utilizing an accordion slide magazine which is transported through a projection slot of a slide projector from one external slide tray to another, the slide tray being of sufficient width to prevent the magazine jamming.

It is a further aim of the present invention to provide a slide projector system that overcomes the above mentioned problems.

The present invention provides a slide projector system for projecting slides comprising a slide projector having a projection slot extending through the slide projector with a projection means to project a slide from a projection position within the projection slot, two external slide trays positioned one on each side of the projection slot in the slide projector, and an accordion slide magazine having a plurality of interconnected pockets adapted to hold slides, the slide magazine movable within the projector slot to transport slides through the slide projector from one tray to another.

In drawings which illustrate embodiments of the invention:

FIG. 1 is a perspective view of the accordion slide projector system according to one embodiment of the invention, a slide projector, two slide trays attached and an accordion slide magazine entering the slide projector;

FIG. 2 is a side view of a series of pockets of an accordion slide magazine;

FIG. 3 is a sectional view taken along line 2—2 of FIG. 2;

FIG. 4 is a sectional view taken along line 4—3 of FIG. 2;

FIG. 5 is a partial top view of the accordion slide projector system shown in FIG. 1 showing how the slide magazine unfolds as it enters the projector;

FIG. 6 is a partial top view similar to FIG. 5 showing how the slide magazine flips over when a subsequent pocket enters the projector;

FIG. 7 is a side view of the projector showing one embodiment of the transport mechanism for transporting slides through the projector;

FIG. 8 is a sectional view taken along line 8—8 of FIG. 7;

Figure 9:
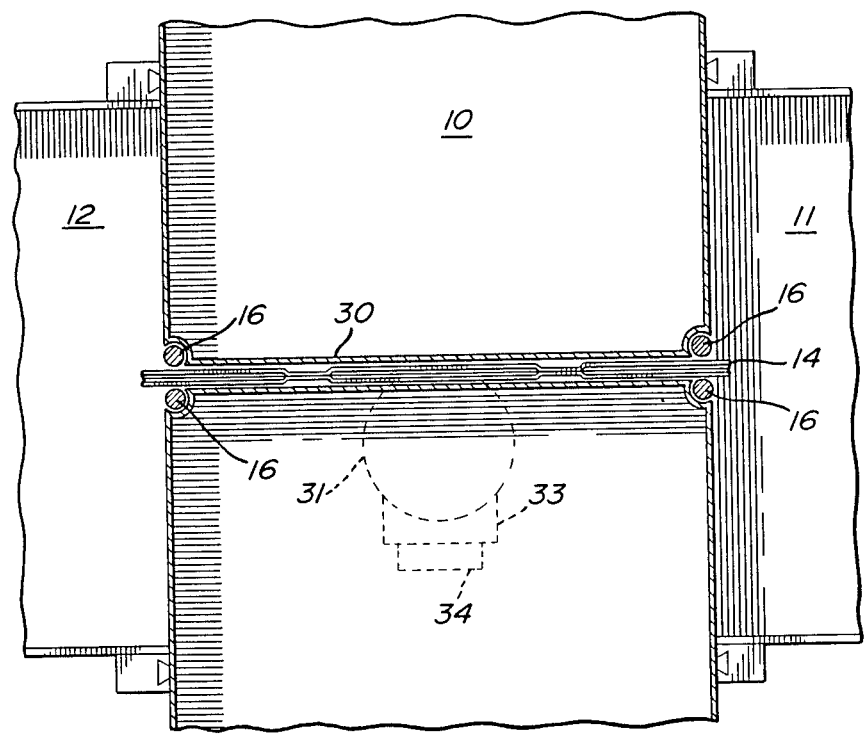
FIG. 9 is a top view of the projector system showing how the slide magazine passes through the projector slot in the projector.

Referring now to the drawings, FIG. 1 shows the general arrangement of a preferred embodiment of the accordion slide projector system.

The projector 10 housing the collimating optics, projecting optics, transport mechanism, electric controls and electric drive mechanism. Projector lens 15 is shown only to give orientation to a functionally symmetrical system. Slide magazine tray 12 is in the embodiment shown, the input tray from which slide magazine 14 upon being transported through the projector goes into an output tray 11.

FIG. 9 shows how the magazine 14 is transported through the projector parallel to the plane of projection guided by the projector slot 30. The freely rotating guide rollers 16 reduce friction as each slide pocket enters the projector 10 whether in the forward direction from the input tray 12 to output tray 11 or in the reverse direction from output tray 11 to input tray 12.

Referring again to FIG. 1, the trays 11 and 12 are open on one side, and have certain minimum width which will be explained later and a length which depends on the number of pockets in the accordion magazine. The trays 11 and 12 are attached to the body of the projector for the purpose of projecting slides and removed when projection is finished. The attachment of trays 11 and 12 is by way of a number of possible ways one of which is shown in 13.

FIGS. 2, 3 and 4 show the preferred embodiment of the accordion slide magazine 14 which is formed by two strips 25 and 26 shown in FIG. 3, of flexible sheet material such as, for example, thermoplastic film or treated paper, to form a series of interconnected rectangular pockets 24 with an opening 17 on one side only. The interconnection between pockets 24 is formed by the hinge portion 19 and a lower continuous edge strip 20. The width of hinge portion 19 is such that when the magazine 14 is folded along the center line of the hinge 19 in an accordion fashion, the pockets lie flat against each other. The memory inherent in the flexible material once it is folded, ensures that the magazine unfolds in an orderly manner and refolds upon leaving the projector. Each pocket 24 has a square cut out 18 leaving the film portion of a slide unobscured regardless whether the film is placed in the pocket 24 vertically or horizontally. Cut out grooves 23 exactly in the middle of the top of the pocket 24 serves to help the insertion and removal of slides. Cut out 21 at each pocket 24 in the edge strip 20 to the left side of the pocket 24 serves to position each pocket correctly at exactly the same point, namely the projection position in the projector. The cam of a microswitch engages in the cut out 21 to provide a signal to an electrical control to stop the drive mechanism.

In a preferred embodiment of the magazine 14, there are round holes 22 in the appropriate diameter spaced equally along edge strip 22 for the entire length of the accordion slide magazine into which the teeth of the transport sprocket or gear engage. This will be described later.

FIGS. 5 and 6 show why the trays 11 and 12 must be of a certain minimum width in order that the accordion magazine unfolds and enters the projector freely without jamming.

FIG. 5 shows magazine 14 unfolding with pocket 27 in the projector slot 30 to be followed by pockets 28 and 9. The position of pocket 28 is that which is naturally taken, that is, close to side 12a of tray 12. FIG. 6 shows pocket 28 in the projection slot 30 to be followed by pocket 29 and the magazine 14 has flipped over to side 12b of tray 12. The width of the inside of tray 12 and tray 11 must be no less than twice the length of the pocket 24 width when the tray width is about the projection slot.

FIGS. 7 and 8 show the preferred embodiment of the transport mechanism for moving the slide magazine across the projector.

FIG. 7 shows the teeth 32 of sprocket 31 engaging in the circular holes 22 of edge strip 20 of the magazine. As sprocket 31 turns clockwise, the magazine is pulled in from tray 12 and pushed out to tray 11 between the collimating optics 35 and the projecting optics 15. As the sprocket turns anticlockwise, the magazine is pulled in from tray 11 and pushed out into tray 12 in the reverse direction. The clutch portion of gearbox and clutch arrangement 33 (not shown) separately can be disengaged by an external push button (not shown) to allow pulling out the magazine manually in the event of an electrical failure. While conical shaped teeth 32 on the sprocket 31 engage in round holes 22 of magazine 14 is illustrated, other shapes of sprocket teeth 32 and holes 22 may be used.

Figure 10:
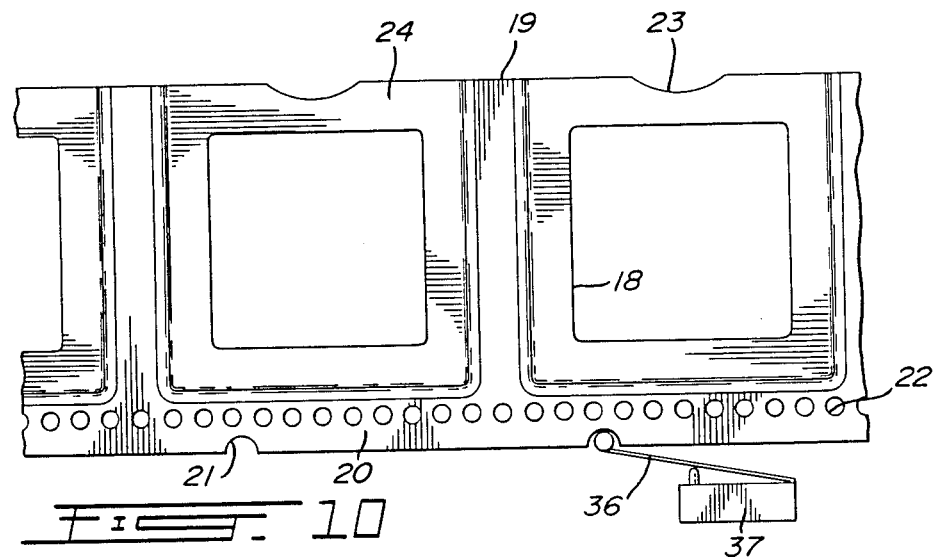
FIG. 10 is a side view of two adjacent pockets in a magazine showing the projection position controlling microswitch engaged.

The stopping of the slide magazine 14 at the projection position with respect to and relative to the collimating optics 35 and the projecting optics 15 is preferably as shown by FIG. 10 where a microswitch 37 in the projector body allows cam 36 to engage in cut out 21 of edge strip 20 of the magazine providing a control signal to the electrical drive mechanism to stop. Notwithstanding the above preference a variety of positioning methods may also be used to accomplish the stopping of the slide magazine at the projection position. The loading of the accordion slide magazine into the projector by the operator is accomplished by choosing the lower of the two speeds with which the transport sprocket 31 rotates, called the 'load speed'. The operator introduces into the projector slot, between the two freely rotating rollers 16, the first pocket 24 of the magazine and pushes the magazine in slowly until transport sprocket 31 engages teeth 32 with the holes 22 of edge strip. Transport sprocket 31 then transports the magazine until cam 36 of microswitch 37 engages in the first cut out 21 of the first pocket 24 and stops the transport mechanism with the first slide ready in the projection position. From this point on the slide magazine is controlled semi-automatically by the appropriate control electronics of the projector.

Although a preferred embodiment of my invention is herein disclosed, it is to be understood that this disclosure is by way of an example and variations are possible without departing from the subject matter coming within the scope of the following claims which I regard as my invention.

The embodiments of the invention in which an exclusive property or privilege is claimed are defined as follows.

1. A slide projector system including a slide projector for projecting slides, comprising:
   an accordion slide magazine having a plurality of interconnected pockets with hinge connection means between the pockets so the magazine is foldable at the hinge connection means into an accordion configuration, each of the pockets adapted to hold a slide and permit projection of the slide while remaining in the pocket;
   a projection slot extending from an opening on one side of the slide projector to an opening on the other side of the projector for the magazine to pass therethrough, the slot having a projection position therein to project a slide held in one of the pockets;
   means to transport the magazine through the projection slot, and
   two slide trays positioned one on each side of the slide projector having surfaces substantially level with the openings for the projection slot, the trays having a width equivalent to at least about two pockets to permit the magazine to unfold when being transported through the projection slot.

2. The slide projector according to claim 1 wherein the slide trays are attachable and detachable from predetermined positions on the sides of the slide projector.

3. The slide projector according to claim 1 wherein the slide trays are rectangular in shape with one open side for positioning on each side of the slide projector.

4. The slide projector system according to claim 1 wherein the accordion slide magazine is made of flexible sheet material, folded over and sealed to form pockets, with a hinge between each of the pockets, and a cutout in the sheet material for each of the pockets to permit projection of slides.

5. The slide projector system according to claim 4 including a bottom edge strip of double sheet material having a plurality of substantially similar holes spaced evenly apart along the length of the magazine for use with the means to transport the magazine through the projection slot.

6. The slide projector system according to claim 1 wherein the means to transport the magazine through the projection slot comprises a sprocket with a plurality of teeth equispaced about the sprocket, the teeth engaging with apertures equispaced along a bottom strip of the magazine.

7. The slide projector system according to claim 6 wherein the sprocket is driven by a reversible variable speed motor through a gearbox and including clutch means.

8. The slide projector system according to claim 1 including cutout means on an edge of the magazine at each pocket, and limit switch means to engage in each cutout means to stop transport means with pocket in the projection position in the projection slot.

9. The slide projector according to claim 1 including freely rotating guide rollers positioned at openings to the projection slot on each side of the slide projector.

* * * * *